US012248264B2

(12) United States Patent
Nakajima

(10) Patent No.: US 12,248,264 B2
(45) Date of Patent: Mar. 11, 2025

(54) FIXING DEVICE AND IMAGE FORMING APPARATUS THEREWITH

(71) Applicant: KYOCERA Document Solutions Inc., Osaka (JP)

(72) Inventor: Eiji Nakajima, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 18/460,800

(22) Filed: Sep. 5, 2023

(65) Prior Publication Data

US 2024/0077820 A1 Mar. 7, 2024

(30) Foreign Application Priority Data

Sep. 5, 2022 (JP) ................................ 2022-140527

(51) Int. Cl.
*G03G 15/20* (2006.01)

(52) U.S. Cl.
CPC ................................ *G03G 15/2064* (2013.01)

(58) Field of Classification Search
CPC ........... G03G 15/2053; G03G 15/2064; G03G 15/206; G03G 15/2028; G03G 2215/2032
See application file for complete search history.

(56) References Cited

U.S. PATENT DOCUMENTS

2005/0158066 A1* 7/2005 Tomiyori ........... G03G 15/2042 399/68
2014/0270823 A1* 9/2014 Sugawara .......... G03G 15/2057 399/45
2018/0307169 A1* 10/2018 Takahashi .......... G03G 15/2064
2021/0397115 A1* 12/2021 Yabuki ................ G03G 15/205

FOREIGN PATENT DOCUMENTS

JP 2008-026373 A 2/2008

* cited by examiner

*Primary Examiner* — Jessica L Eley
(74) *Attorney, Agent, or Firm* — Stein IP, LLC

(57) ABSTRACT

A fixing device includes a first rotary member, a second rotary member, a pressing mechanism, and a heat-levelling member. The second rotary member is formed in a reverse-camber shape. The pressing mechanism can form a fixing nip and can reduce the pressing force between the first and second rotary members. The heat-levelling member, in a reduced-pressure state where the pressing force is lower than the fixing nip pressure, stays in contact with a part of the outer circumferential surface of the second rotary member elsewhere than the fixing nip, over the entire range in the rotation axis direction, to equalize the surface temperature of the second rotary member and, in a state where the pressing force is equal to or higher than the fixing nip pressure, stays away from the outer circumferential surface.

4 Claims, 3 Drawing Sheets

FIXING DEVICE AND IMAGE FORMING APPARATUS THEREWITH

INCORPORATION BY REFERENCE

This application is based on and claims the benefit of priority from Japanese Patent Application No. 2022-140527 filed on Sep. 5, 2022, the contents of which are hereby incorporated by reference.

BACKGROUND

The present disclosure relates to a fixing device, and to an image forming apparatus incorporating a fixing device.

In image forming apparatuses, for the purpose of fixing a toner image to a sheet (of a recording medium such as print paper, envelopes, and OHP sheets), there are widely used fixing devices in which a heated roller (one of a first and a second rotary member) and a pressing roller (the other of the first and second rotary member) are brought into pressed contact with each other to form a fixing nip. In such a fixing device, while a sheet is passed through the fixing nip, heat and a predetermined pressure (fixing nip pressure) are applied to the toner image, so that the toner image is fused and fixed to the sheet. During a stand-by period (a period in which no printing operation is being performed), the pressure is reduced from the fixing nip pressure to maintain a reduced-pressure state.

The pressing roller in such a fixing device typically has a reverse-camber shape. With the reverse-camber shape, the pressing roller is shaped such that its outer diameter increases from a middle part to opposite end parts of it along the rotation axis direction. With the reverse-camber shape, the pressing roller is less likely to develop creases in the sheet passing through the fixing nip. The reverse-camber shape may be formed not on the pressing roller but on the heated roller.

Some of fixing devices as described above include a heat-levelling member. The heat-levelling member is kept in contact with the outer circumferential surface of the heated roller in printing operation, largely uniformly along the rotation axis direction of the heated roller. The heat-levelling member absorbs heat from the outer circumferential surface of the heated roller to equalize the temperature there in the rotation axis direction. If the heat-levelling member is kept in contact with the pressing roller (or heated roller) during printing operation, a very small amount of toner that has fused to the pressing roller (or heated roller) by what is called the fixing offset phenomenon may transfer to the heat-levelling member. This may diminish the heat-levelling performance of the heat-levelling member, or may cause the toner having transferred to the heat-levelling member to transfer back to the pressing roller (or heated roller) and further attach to the subsequent sheet passing through the fixing nip, leading to soiling of the sheet. To avoid this, image forming apparatuses as mentioned above are often configured to employ a cleaning brush for removing the toner that has transferred to the outer circumferential surface of the heat-levelling member.

SUMMARY

To achieve the above object, according to one aspect of the present disclosure, a fixing device includes a first rotary member, a second rotary member, and a pressing mechanism. The second rotary member is disposed opposite the first rotary member, and is formed in a reverse-camber shape such that its outer diameter increases from a middle part to opposite end parts of it with respect to the rotation axis direction. The pressing mechanism can bring the first and second rotary members into pressed contact with each other to form a fixing nip between them, and can also reduce the pressing force between the first and second rotary members. The fixing device heats, and presses with a predetermined fixing nip pressure, a sheet passing through the fixing nip, and thereby fuses and fixes an unfixed toner image on the sheet to the sheet. The fixing device further includes a heat-levelling member that, in a reduced-pressure state where the pressing force is reduced to be lower than the fixing nip pressure, stays in contact with a part of the outer circumferential surface of the second rotary member elsewhere than the fixing nip, over the entire range in the rotation axis direction, so as to equalize the surface temperature of the second rotary member and, in a state where the pressing force is equal to or higher than the fixing nip pressure, stays away from the outer circumferential surface.

DETAILED DESCRIPTION

Figure 1:
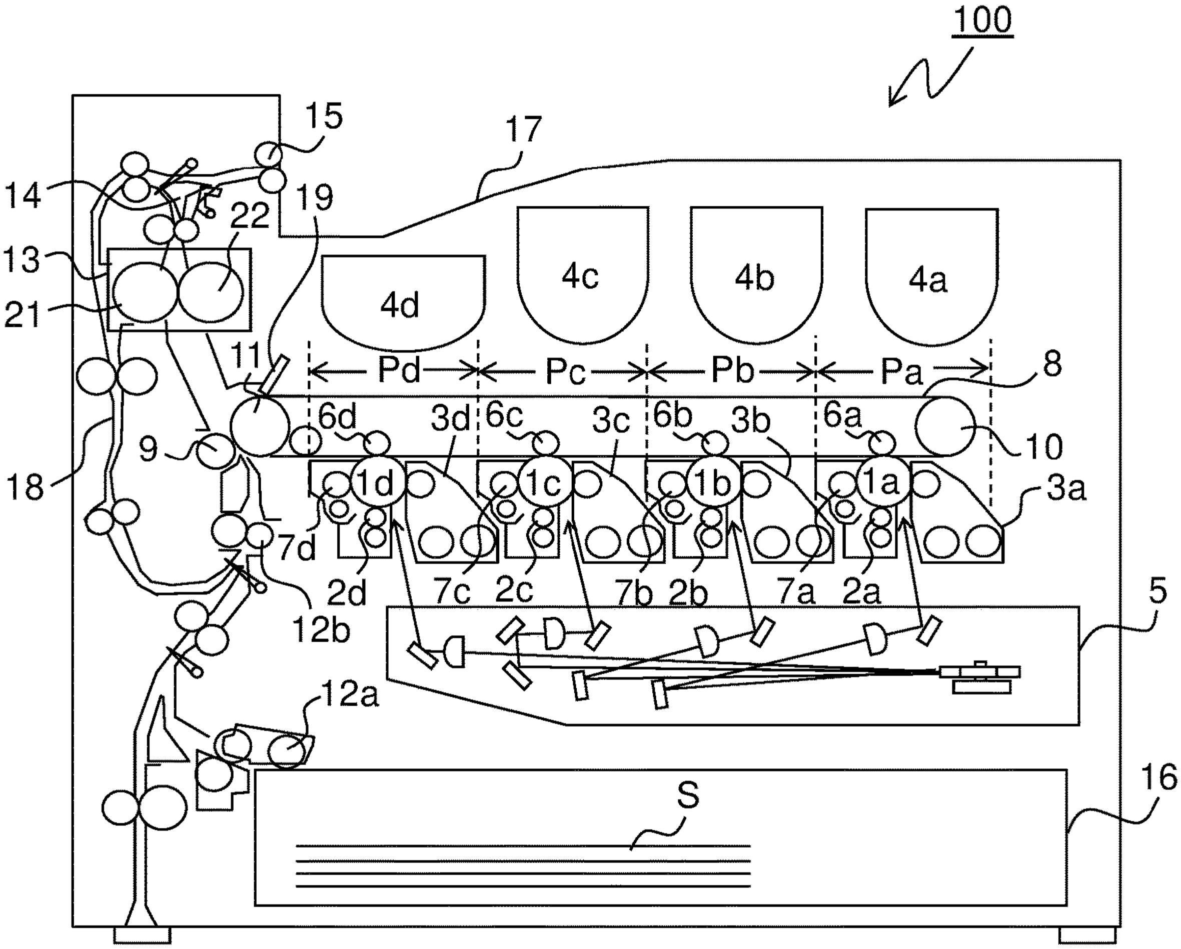
FIG. 1 is a schematic sectional view showing the internal construction of an image forming apparatus according to an embodiment of the present disclosure.

An embodiment of the present disclosure will be described below with reference to the accompanying drawings. FIG. 1 is a schematic sectional view showing the internal construction of an image forming apparatus 100 according to an embodiment of the present disclosure. The image forming apparatus 100 (here, a color printer) has, inside its body, four image forming units Pa, Pb, Pc, and Pd arranged in this order from upstream (in FIG. 1, from right) in the conveyance direction. These image forming units Pa to Pd are provided to correspond to four different colors (cyan, magenta, yellow, and black), and sequentially form a cyan, a magenta, a yellow, and a black image respectively, each through the processes of electrostatic charging, exposure to light, image development, and image transfer.

The image forming units Pa to Pd include photosensitive drums 1*a*, 1*b*, 1*c*, and 1*d* for carrying visible images (toner images) of the different colors. An intermediate transfer belt 8 that rotates clockwise in FIG. 1 is provided beside the image forming units Pa to Pd. The toner images formed on the photosensitive drums 1*a* to 1*d* are primarily transferred to the intermediate transfer belt 8, which moves while in contact with the photosensitive drums 1*a* to 1*d*, sequentially so as to be overlaid on each other. After that, the toner images primarily transferred to the intermediate transfer belt 8 are, by a secondary transfer roller 9, secondarily transferred to a sheet S as one example of a recording medium. The sheet S having the toner images secondarily transferred to it has those toner images fixed to it in a fixing device 13, and is then discharged out of the body of the image forming apparatus 100. While the photosensitive drums 1*a* to 1*d* are rotated clockwise in FIG. 1 by a main motor (not shown), an image forming process is performed with respect to each of the photosensitive drums 1*a* to 1*d*.

The sheet S to which the toner images are to be secondarily transferred is stored in a sheet cassette 16 disposed in a lower part in the body of the image forming apparatus 100. The sheet S is conveyed via a sheet feed roller 12*a* and a pair of registration rollers 12*b* to the nip between the secondary transfer roller 9 and a driving roller 11 for the intermediate transfer belt 8. The intermediate transfer belt 8 employs a sheet of a dielectric resin and typically is a belt with no seams (seamless belt). Downstream of the secondary transfer roller 9 is disposed a belt cleaner 19 in the form of a blade for removing the toner and the like left behind on the surface of the intermediate transfer belt 8.

Next, the image forming units Pa to Pd will be described. Around and below the photosensitive drums 1*a* to 1*d*, which are rotatably arranged, there are provided charging devices 2*a*, 2*b*, 2*c*, and 2*d* for electrostatically charging the photosensitive drums 1*a* to 1*d*, an exposure device 5 for exposing the photosensitive drums 1*a* to 1*d* to light carrying image information, developing devices 3*a*, 3*b*, 3*c*, and 3*d* for forming toner images on the photosensitive drums 1*a* to 1*d*, and cleaning device 7*a*, 7*b*, 7*c*, and 7*d* for removing the developer (toner) and the like that are left behind on the photosensitive drums 1*a* to 1*d*.

When image data is entered from a host device such as a personal computer, first, the charging devices 2*a* to 2*d* electrostatically charge the surfaces of the photosensitive drums 1*a* to 1*d* uniformly. Next, the exposure device 5 shines light carrying image data so as to form electrostatic latent images according to the image data on the photosensitive drums 1*a* to 1*d*. The developing devices 3*a* to 3*d* are loaded with predetermined amounts of two-component developer containing toners of different colors, namely cyan, magenta, yellow, and black, respectively. When, with the progress of toner image formation as described above, the proportion of toner in the two-component developer in any of the developing devices 3*a* to 3*d* becomes lower than a prescribed value, the developing device 3*a* to 3*d* is supplied with toner from the corresponding one of toner containers 4*a* to 4*d*. The toner in the developer is fed from the developing devices 3*a* to 3*d* onto the photosensitive drums 1*a* to 1*d* and electrostatically attaches to them. Thus, according to the electrostatic latent images formed by exposure to the light from the exposure device 5, toner images are formed.

Then, primary transfer rollers 6*a* to 6*d* apply an electric field with a predetermined transfer voltage between the primary transfer rollers 6*a* to 6*d* and the photosensitive drums 1*a* to 1*d*, so that the cyan, magenta, yellow, and black toner images on the photosensitive drums 1*a* to 1*d* are primarily transferred to the intermediate transfer belt 8. These images of four colors are formed in a prescribed positional relationship previously determined for the formation of a predetermined full-color image. After that, in preparation for the subsequent formation of new electrostatic latent images, the toner and the like left behind on the surfaces of the photosensitive drums 1*a* to 1*d* are removed by the cleaning device 7*a* to 7*d*.

The intermediate transfer belt 8 is stretched between a driven roller 10, arranged upstream, and the driving roller 11, arranged downstream. When a belt driving motor (not shown) rotates the driving roller 11 and the intermediate transfer belt 8 starts to rotate clockwise, a sheet S is conveyed from the pair of registration rollers 12*b*, with predetermined timing, to the nip (secondary transfer nip) between the driving roller 11 and the secondary transfer roller 9, which are arranged next to each other. Thus, the full-color image on the intermediate transfer belt 8 is secondarily transferred to the sheet S. The sheet S having the toner images transferred to it is conveyed to the fixing device 13.

The sheet S conveyed to the fixing device 13 is heated and pressed so that the toner images are fixed to the surface of the sheet S, and thus the predetermined full-color image is formed. The sheet S having the full-color image formed on it has its conveyance direction switched by a branch unit 14 that branches into a plurality of directions so as to be discharged as it is (or after being fed to a duplex conveyance passage 18 to have images formed on both sides) onto a discharge tray 17 by a pair of discharge rollers 15.

Figure 2:
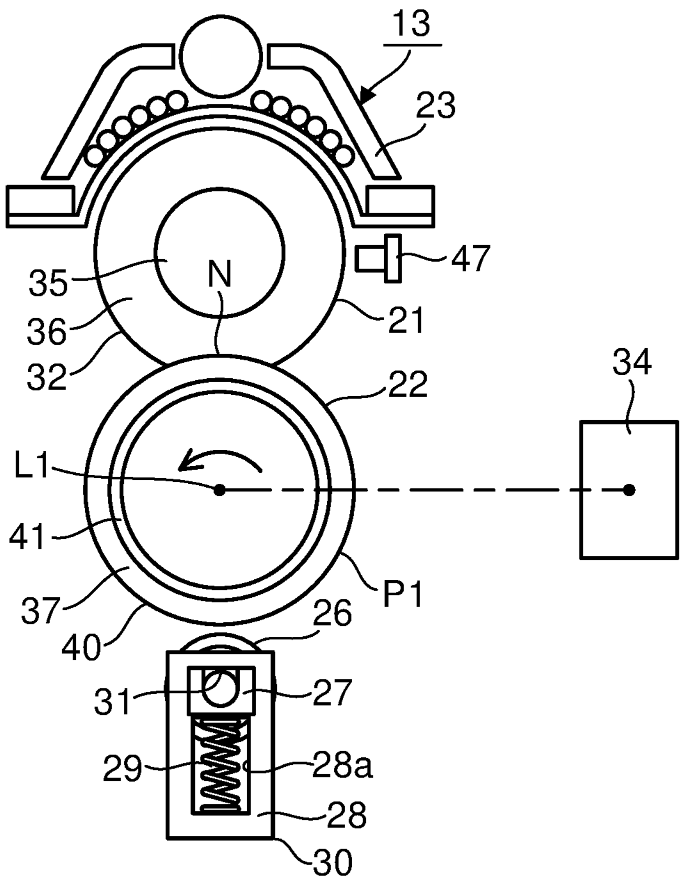
FIG. 2 is a side sectional view of a fixing device incorporated in the image forming apparatus.

Next, the fixing device 13 will be described in detail. FIG. 2 is a side sectional view of the fixing device 13 incorporated in the image forming apparatus 100. Note that, in FIG. 2, the right side with respect to the fixing nip N is the upstream side in the sheet insertion direction (sheet conveyance direction) with respect to the fixing device 13 and the left side with respect to the fixing nip N is the downstream side in the sheet insertion direction with respect to the fixing device 13. As shown in FIG. 2, the fixing device 13 includes a heated roller 21 (first rotary member), a heating unit 23, a thermistor 47, a pressing roller 22 (second rotary member), a pressing mechanism 34, and a heat-leveling device 30.

The heated roller 21 is supported on the housing (not shown) of the fixing device 13 so as to be rotatable about a horizontal shaft. The heated roller 21 includes a metal base 35, an elastic portion 36, and a belt member 32. The metal base 35 is made of aluminum and is formed in a cylindrical shape. The elastic portion 36 is stacked on the outer circumferential surface of the metal base 35. The elastic portion 36 is formed of foamed silicone rubber.

The belt member 32 is fitted around the elastic portion 36. The belt member 32 has a multi-layer structure (omitted from illustration) in which a heating layer, an elastic layer, and a release layer are stacked together. The heating layer is the base layer and faces the outer circumferential surface of the elastic portion 36. On the outer circumferential surface (the side opposite from the elastic portion 36) of the heating layer, the elastic layer is stacked, and on the outer circumferential surface of the elastic layer, the release layer is stacked.

The heating layer is formed of, for example, a film of metal such as nickel with a thickness of 30 μm to 50 μm or, for example, a film of polyimide mixed with a powder of metal such as copper, silver, or aluminum with a thickness of 50 μm to 100 μm. The elastic layer is formed of, for example, silicone rubber or the like with a thickness of 100 μm to 500 μm. The release layer is formed of, for example, a fluorocarbon resin such as PFA (tetrafluoroethylene-perfluoroalkyl vinyl ether copolymer) with a thickness of 30 μm to 50 μm.

The heating unit 23 is a heater of an induction heating (IH) type. The heating unit 23 makes the heating layer in the belt member 32 generate heat by induction heating. The heating unit 23 is disposed in a region opposite, with respect to the belt member 32, from where the pressing roller 22 is disposed, at a predetermined distance from the belt member 32, so as to face the outer circumferential surface of the belt member 32. The heating unit 23 extends along the axial direction of the belt member 32 (the direction of the width of the sheet S, the direction perpendicular to the plane of FIG. 2) to be slightly longer than the belt member 32.

As the heating unit 23 heats the belt member 32, via the belt member 32 the elastic portion 36 is heated. The elastic portion 36 then thermally expands to press the belt member 32 from inward. The pressing force permits the belt member 32 to rotate together with the elastic portion 36.

The thermistor 47 is disposed so as to face the outer circumferential surface of the belt member 32. The thermistor 47 can sense the surface temperature of the belt member 32. According to the result of sensing by the heating unit 23, the heating unit 23 adjusts the temperature of the belt member 32.

Figure 3:
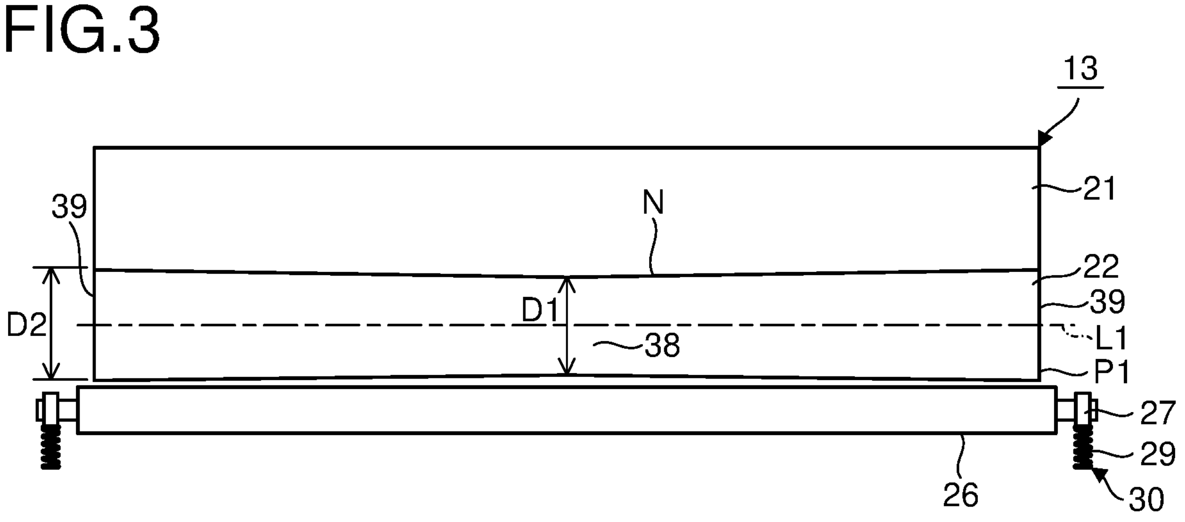
FIG. 3 is a diagram showing a heated roller and a pressing roller shown in FIG. 2 as seen in a plan view from a direction orthogonal to a rotation axis direction.

FIG. 3 is a diagram showing the heated roller 21 and the pressing roller 22 shown in FIG. 2 as seen in a plan view from a direction orthogonal to the rotation axis direction. As shown in FIGS. 2 and 3, the pressing roller 22 is disposed opposite the heated roller 21.

The pressing roller 22 is in a cylindrical shape. Through the center of the pressing roller 22 in the radial direction runs a rotation axis L1. The pressing roller 22 is supported so as to be rotatable about the rotation axis L1. The pressing roller 22 has a driving source such as a motor (omitted from illustration) connected to it. The driving source rotates the pressing roller 22. In the following description, a direction parallel to the rotation axis L1 will be referred to simply as the "rotation axis direction".

Figure 5:
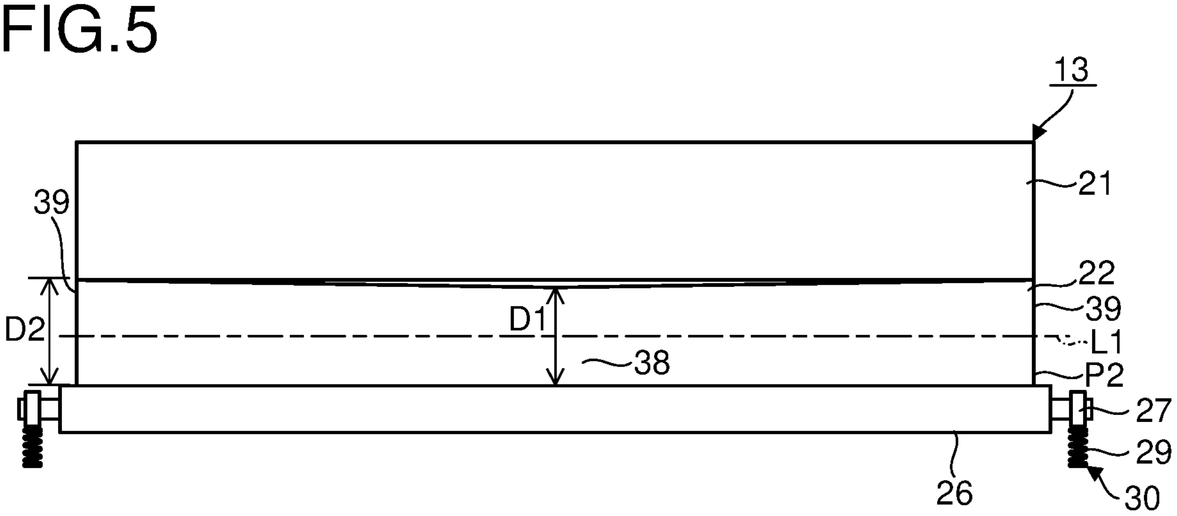
FIG. 5 is a diagram showing the heated roller and the pressing roller shown in FIG. 4 as seen from a direction orthogonal to the rotation axis direction.

The pressing roller 22 is formed in a reverse-camber shape (see FIGS. 3 and 5). Having a reverse-camber shape, the pressing roller 22 is so shaped that its outer diameter D2 in opposite end parts 39 along the rotation axis direction is larger than its outer diameter D1 in a middle part 38.

The pressing roller 22 includes a metal base 41, an elastic portion 37, and a release layer 40. The metal base 41 is a circular columnar member of aluminum or the like. The elastic portion 37 is stacked on the outer circumferential surface of the metal base 41. The elastic portion 37 is formed of silicone rubber. The release layer 40 is stacked on the outer circumferential surface of the elastic portion 37. The release layer 40 is formed of a fluorocarbon resin such as PFA.

Figure 4:
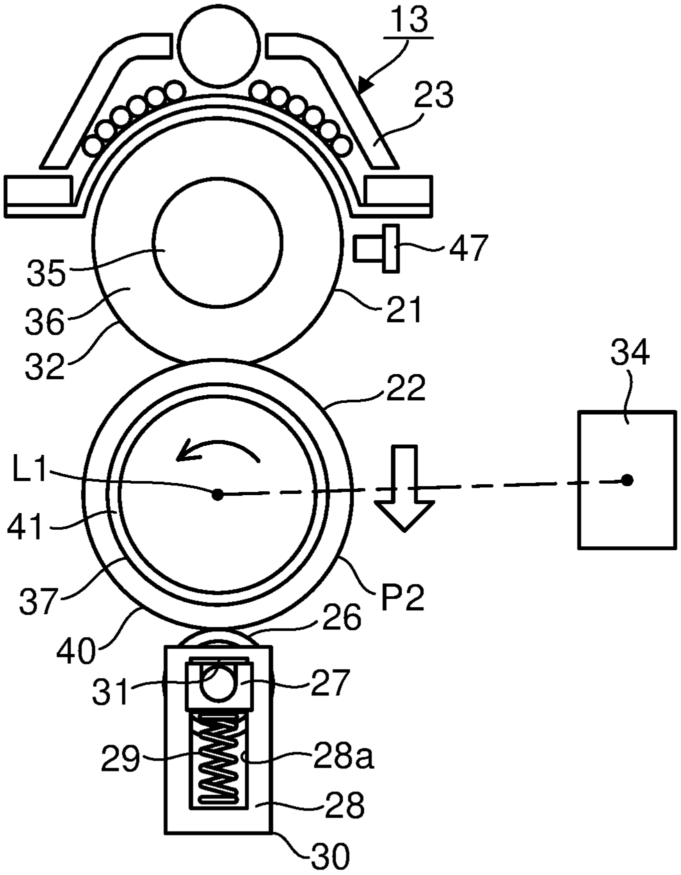
FIG. 4 is a side sectional view of the fixing device in a state where the pressing roller is located in a reduced-pressure position.

FIG. 4 is a side sectional view of the fixing device 13 in a state where the pressing roller 22 is located in a reduced-pressure position P2. FIG. 5 is a diagram showing the heated roller 21 and the pressing roller 22 shown in FIG. 4 as seen in a plan view from a direction orthogonal to the rotation axis direction. The pressing mechanism 34 is configured to be capable of moving the pressing roller 22 closer to and away from the heated roller 21.

The pressing mechanism 34 can move the pressing roller 22 between a pressing position P1 and the reduced-pressure position P2. The pressing position P1 is a position where the outer circumferential surface of the pressing roller 22 makes contact with the outer circumferential surface of the heated roller 21 under a predetermined nip pressure (hereinafter referred to simply as the "fixing nip pressure"). The reduced-pressure position P2 is a position where the contact pressure between the outer circumferential surface of the pressing roller 22 and the outer circumferential surface of the heated roller 21 is lower than the fixing nip pressure (see FIGS. 4 and 5).

The fixing nip pressure mentioned above is the pressure suitable to fix a toner image on a sheet S to the surface of the sheet S. The value of the fixing nip pressure is previously stored in a controller (omitted from illustration) provided at an appropriate place in the image forming apparatus 100.

When fixing operation is performed, the pressing mechanism 34, using a driving source (not shown) such as a motor, moves the pressing roller 22 to the pressing position P1 as shown in FIGS. 2 and 3 to form the fixing nip N. Here, the pressing mechanism 34 moves the pressing roller 22 such that the pressing force between the pressing roller 22 and the heated roller 21 equals the fixing nip pressure mentioned above.

By contrast, in a stand-by period (a period in which no image forming operation is in progress), the pressing mechanism 34, using the driving source mentioned above, moves the pressing roller 22 from the pressing position P1 to the reduced-pressure position P2 as shown in FIGS. 4 and 5 to reduce the pressing force between the pressing roller 22 and the heated roller 21 such that it is lower than the fixing nip pressure. The pressing mechanism 34 is controlled by the controller (omitted from illustration) mentioned above.

The heat-leveling device 30 includes a heat-leveling roller 26 (heat-leveling member), a support portion 27, a guide portion 28, and an urging member 29. The heat-leveling roller 26 is a circular columnar member made of aluminum. The heat-leveling roller 26 is, at opposite end parts of it in the rotation axis direction, rotatably supported on the support portion 27.

The guide portion 28 has a guide hole 28*a* formed to be elongate along the direction in which the pressing roller 22 and the pressing roller 22 lie opposite each other (i.e., the direction of a straight line passing through the rotation centers of the pressing roller 22 and the heated roller 21). The support portion 27 is supported on the guide portion 28 so as to be movable in directions toward and away from the pressing roller 22. At the upper end of the guide hole 28*a* (its part closest to the pressing roller 22), a restricting portion 31 is formed.

The restricting portion 31 restricts the movement of the heat-leveling roller 26 by making contact with the support portion 27 at a position (detached position) halfway along the movement of the heat-leveling roller 26 approaching the pressing roller 22. The urging member 29 urges, via the guide portion 28, the heat-leveling roller 26 toward the pressing roller 22. The urging member 29 is an elastic member such as a coil spring.

With the pressing roller 22 in the pressing position P1, the movement of the heat-leveling roller 26 is restricted by the restricting portion 31 at a position detached from the pressing roller 22.

With the pressing roller 22 in the reduced-pressure position P2 (reduced-pressure state), the heat-leveling roller 26 lies in contact with the pressing roller 22. In this state, the heat-leveling roller 26 makes contact with the pressing roller 22 over its entire range along the rotation axis direction. Thus, via the heat-leveling roller 26, the temperature of the outer circumferential surface of the pressing roller 22 is equalized over the entire range. Rotating the pressing roller 22 with it in contact with the heat-leveling roller 26 makes the heat-leveling roller 26 rotate by following the pressing roller 22.

As described above, on the image forming apparatus 100 according to the embodiment described above, in the reduced-pressure state, the surface temperature of the pressing roller 22 is equalized. This suppresses, in a stand-by period, thermal expansion of a middle part of the pressing roller 22 and thermal contraction of opposite end parts of it, and thus the reverse-camber shape is easier to maintain. It is thus possible to suppresses creases developing in a sheet S during its conveyance immediately after a stand-by period. Moreover, in the reduced-pressure state, where no fixing operation is in progress, the heat-leveling roller 26 lies in contact with the pressing roller 22. This makes it difficult for the toner that has transferred to the pressing roller 22 during fixing operation to transfer from the pressing roller 22 to the heat-leveling roller 26. It is then possible to omit a structure for removing the toner that has transferred to the heat-leveling roller 26. It is thus possible, while suppressing an increase in manufacturing cost, to suppress soiling of sheets. Hence it is possible to provide a fixing device 13 that, while suppressing an increase in manufacturing cost, can suppress transfer of toner to a heat-leveling roller 26 and suppress creases developing in a sheet S during its conveyance.

On known fixing devices 13, it is common to move, using a driving source such as a solenoid or motor, a heat-leveling member for leveling the heat in the pressing roller 22 to move the pressing roller 22 and the heat-levelling member into and out of contact with each other. This may result in a complicated construction and increased manufacturing cost of the fixing device 13. By contrast, in the fixing device 13 according to the above embodiment, as described above, the pressing roller 22, when arranged in the reduced-pressure position P2, stays in contact with the heat-leveling roller 26 and, when arranged in the pressing position P1, stays away from the heat-leveling roller 26. That is, moving the pressing roller 22 between the pressing position P1 and the reduced-pressure position P2 to form the fixing nip N results in simultaneously moving the heat-leveling roller 26 and the pressing roller 22 into and out of contact with each other. It is thus possible to move the heat-leveling roller 26 and the pressing roller 22 closer to and away from each other with a simple construction, and this helps suppress an increase in the manufacturing cost of the fixing device 13.

Moreover, as described above, rotating the pressing roller 22 with it in contact with the heat-leveling roller 26 makes the heat-leveling roller 26 rotate by following the pressing roller 22. This helps reduce the friction between the outer circumferential surface of the 22 and the outer circumferential surface of the heat-leveling roller 26, and helps suppress wear on the pressing roller 22 and the heat-leveling roller 26.

The present disclosure is not limited by the embodiment described above and allows for many modifications without departure from the spirit of the present disclosure. For example, while in the above embodiment the urging member 29 and the restricting portion 31 serve to move the heat-leveling roller 26 into and out of contact with the pressing roller 22, this may be modified as follows. For example, a motor or other driving source may enable the heat-leveling roller 26 to move closer to and away from the pressing roller 22. In this case, with the pressing roller 22 located in the pressing position P1 (a state in which to perform fixing operation), the driving source moves the heat-leveling roller 26 away from the pressing roller 22.

While in the above embodiment the pressing roller 22 has a reverse-camber shape, instead the heated roller 21 may be formed in a reverse-camber shape and the pressing roller 22 in a cylindrical shape of a straight tube. In that case, the heat-leveling roller 26 is moved into and out of contact with the heated roller 21.

The heat-leveling device 30 may include, instead of the heat-leveling roller 26, a heat-levelling member that is fixed and does not rotate. In that case, it is preferable that the heat-levelling member have, in its part in contact with the pressing roller 22, a face with a corner-rounded or arc shape. This helps reduce the friction between the pressing roller 22 and the heat-levelling member and suppress wear on the pressing roller 22 and the heat-levelling member.

The present disclosure finds applications in fixing devices that pass a sheet through a fixing nip formed between a heated rotary member and a pressing rotary member to apply heat and pressure to a toner image and thereby fuse and fix the toner image to the sheet. Based on the present disclosure, it is possible to provide a fixing device that, while suppressing an increase in manufacturing cost, can suppress transfer of toner to a heat-levelling member and suppress creases developing in a sheet during its conveyance.

What is claimed is:

1. A fixing device including:

a first rotary member;

a second rotary member disposed opposite the first rotary member and formed such that an outer diameter of the second rotary member increases from a middle part of the second rotary member located at a middle in a rotation axis direction along a rotation axis of the second rotary member to opposite end parts of the second rotary member located at opposite ends in the rotation axis direction; and a pressing mechanism capable of bringing the first and second rotary members into pressed contact with each other to form a fixing nip therebetween and capable of reducing a pressing force between the first and second rotary members, the fixing device heating, and pressing with a predetermined fixing nip pressure, a sheet passing through the fixing nip, the fixing device thereby fusing and fixing an unfixed toner image on the sheet to the sheet, the fixing device comprising a heat-levelling member that, in a reduced-pressure state where the pressing force is reduced to be lower than the fixing nip pressure, stays in contact with a part of an outer circumferential surface of the second rotary member elsewhere than the fixing nip, over an entire range in the rotation axis direction, so as to equalize a surface temperature of the second rotary member and that, in a state where the pressing force is equal to or higher than the fixing nip pressure, stays away from the outer circumferential surface.

2. The fixing device according to claim 1, further comprising:

a heating unit that heats the first rotary member, wherein the second rotary member is supported so as to be movable between a pressing position where the pressing force equals the fixing nip pressure and a reduced-pressure position where the reduced-pressure state is maintained, and the pressing mechanism changes the pressing force by moving the second rotary member between the pressing position and the reduced-pressure position.

3. The fixing device according to claim 2, wherein the heat-levelling member is supported so as to be movable toward and away from the second rotary member, the fixing device further includes:

an urging member that urges the heat-levelling member toward the second rotary member; and a restricting portion that, in a state where the fixing nip is formed, restricts movement of the heat-levelling member by the urging member at a detached position where the heat-levelling member stays away from the second rotary member, and with the second rotary member located in the pressing position, the heat-levelling member is kept in contact with the second rotary member under the urging force of the urging member and, with the second rotary member located in the reduced-pressure position, the heat-levelling member is kept away from the second rotary member by the restricting portion.

4. An image forming apparatus, comprising:

the fixing device according to claim 1 that fixes the toner image on the sheet to the sheet; and an image forming unit disposed upstream of the fixing nip with respect to a conveyance direction of the sheet, the image forming unit forming the toner image on the sheet.

* * * * *